United States Patent [19]

Sakakiyama

[11] Patent Number: 4,723,644
[45] Date of Patent: Feb. 9, 1988

[54] ELECTROMAGNETIC CLUTCH CONTROL SYSTEM FOR AUTOMOBILES

[75] Inventor: Ryuzo Sakakiyama, Tokyo, Japan

[73] Assignee: Fuji Jukogyo Kabushiki Kaisha, Tokyo, Japan

[21] Appl. No.: 774,253

[22] Filed: Sep. 9, 1985

[30] Foreign Application Priority Data

Sep. 13, 1984 [JP] Japan .................. 59-193408

[51] Int. Cl.⁴ ............... B60K 41/02; F16D 37/02
[52] U.S. Cl. .................. 192/0.033; 192/0.052; 192/0.076; 192/0.092; 192/21.5
[58] Field of Search ........... 192/0.033, 0.052, 0.076, 192/0.092, 0.096, 21.5

[56] References Cited

U.S. PATENT DOCUMENTS

| | | | |
|---|---|---|---|
| 3,402,793 | 9/1968 | Scholl .................. | 192/0.033 |
| 4,449,617 | 5/1984 | Sakakiyama et al. ...... | 192/0.033 |
| 4,449,620 | 5/1984 | Sakakiyama ............ | 192/0.052 |
| 4,461,374 | 7/1984 | Umezawa ............... | 192/21.5 |
| 4,466,521 | 8/1984 | Hattori et al. .......... | 192/0.052 X |
| 4,480,732 | 11/1984 | Takano ................. | 192/0.052 |
| 4,494,641 | 1/1985 | Sakakiyama ............ | 192/0.076 |
| 4,567,969 | 2/1986 | Makita ................. | 192/21.5 X |

FOREIGN PATENT DOCUMENTS 2071803  9/1981  United Kingdom .......... 192/21.5

Primary Examiner—Rodney H. Bonck
Assistant Examiner—Richard M. Lorence
Attorney, Agent, or Firm—Martin A. Farber

[57] ABSTRACT

A system for controlling an electromagnetic clutch of an engine for a motor vehicle having a transmission. The system has various sensors such as an engine speed sensor, a vehicle speed sensor for detecting low vehicle speed, an accelerator pedal position sensor for detecting the acceleration of the engine, and a selector lever position sensor. The system has a computing unit for determining the clutch current at the beginning of engagement of the electromagnetic clutch. The rate of change of clutch current with respect to engine speed increases as the acceleration of engine speed increases.

4 Claims, 9 Drawing Figures

ELECTROMAGNETIC CLUTCH CONTROL SYSTEM FOR AUTOMOBILES

BACKGROUND OF THE INVENTION

The present invention relates to a system for controlling an electromagnetic clutch for an automotive engine, and more particularly to a system for controlling clutch current at engagement of the clutch.

An electromagnetic powder clutch as a type of electromagnetic clutch for a motor vehicle is known, for example in U.S. Pat. No. 4,494,641. The electromagnetic powder clutch comprises an annular drive member secured to a crankshaft of an engine, a magnetizing coil provided in the drive memeber, a driven member secured to an input shaft of a transmission and spaced adjacent to the drive member by a small gap and magnetic powder provided in a chamber in the clutch. Change speed gears in the transmission are changed by operating a selector lever. The selector lever is provided with a switch for the circuit of the magnetizing coil. When the selector lever is gripped by the operator's hand, the switch is opened to cut off the clutch current. Accordingly, a change gear operation of the transmission can be done. When the selector lever is shifted to the gear engaging position and released from the hand, the switch is closed so that electric current flows through the magnetizing coil to magnetize the drive member. As engine speed increases in accordance with the depression of an accelerator pedal, the clutch current applied to the coil increases with increase of repetition frequency of ignition pulses. The magnetic powder aggregates in the gap between the drive member and the driven member, so that the driven member is coupled to the drive member. More particularly, the clutch current passing through the magnetizing coil progressively increases according to an increase of the frequency of the ignition pulses, while the clutch slips between the drive member and driven member and gradually engages until the clutch current increases to rated current. Thus, the motor vehicle may be smoothly started by depressing the accelerator pedal without operating a clutch pedal.

FIG. 9 shows the relationship between engine speed and clutch torque. The clutch torque increases exponentially with an increase of engine speed. However, it is desirable to vary the speed of the engagement of the clutch in accordance with the speed of increase of the engine speed, in order to reduce shock at engagement of the clutch.

SUMMARY OF THE INVENTION

The object of the present invention is to provide a system which controls clutch current in accordance with the magnitude of acceleration and deceleration of the engine speed, so that a motor vehicle can be smoothly started.

According to the present invention, there is provided a system for controlling an electromagnetic clutch of an engine comprising engine speed sensing means for producing an engine speed signal dependent on the engine speed of the engine, vehicle speed sensing means for producing a vehicle speed signal in a low vehicle speed range, an accelerator pedal position sensor for producing an acceleration signal when an accelerator pedal of a motor vehicle is depressed, and selector lever position detecting means for producing a selector lever signal when a selector lever of a transmission is positioned other than at a neutral position and a parking position. The system further comprises circuit means for supplying clutch current to a magnetizing coil of the electromagnetic clutch, and means responsive to the engine speed signal, vehicle speed signal, acceleration signal, and selector lever signal for controlling circuit means to determine the clutch current at the beginning of the engagement of the electromagnetic clutch. The clutch current increases as the acceleration of engine speed increases.

The other objects and features of this invention will become understood from the following description with reference to the accompanying drawings.

DETAILED DESCRIPTION OF THE PREFERRED EMBODIMENTS

Figure 1:
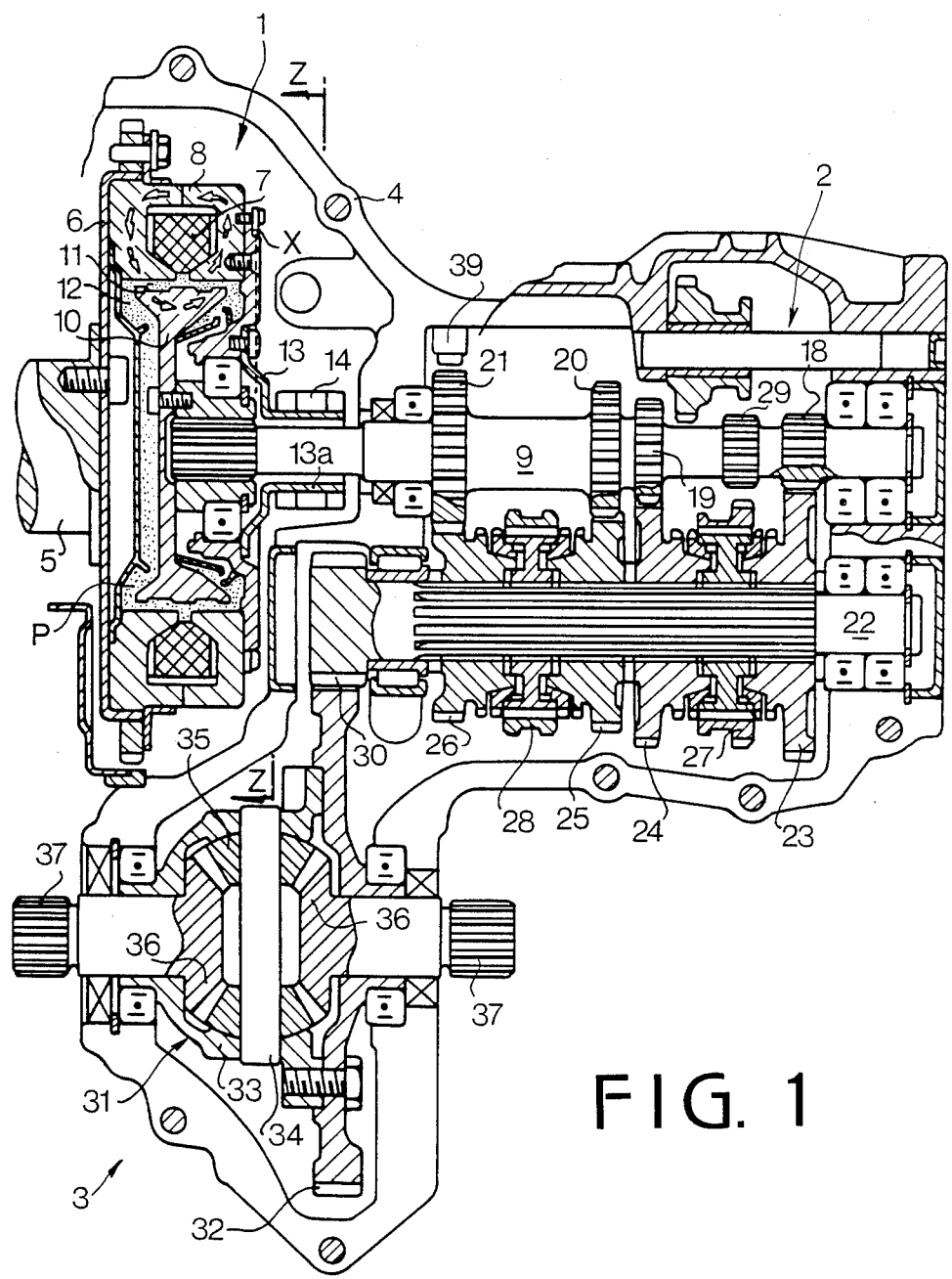
FIG. 1 is a cross-sectional view of an electromagnetic powder clutch used in a system according to the present invention.
Figure 2:
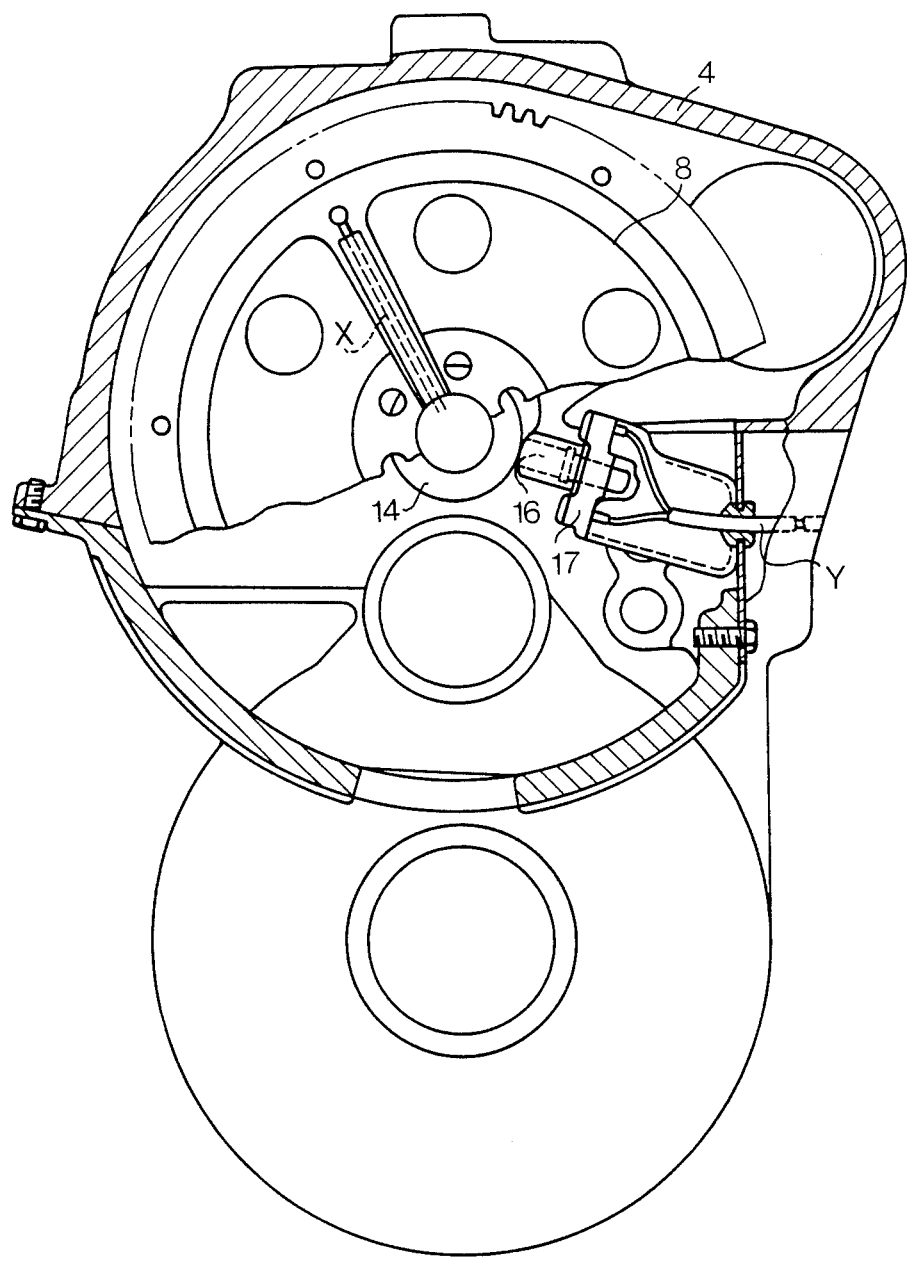
FIG. 2 is a cross-section taken along line Z—Z of FIG. 1.

Referring to FIGS. 1 and 2 showing a transmission system to which the present invention is applied, the transmission system comprises an electromagnetic powder clutch 1, a four-speed transmission 2 and a final reduction device 3.

The electromagnetic powder clutch 1 provided in a clutch case 4 comprises a drive plate 6 secured to the end of a crankshaft 5 of an internal combustion engine, an annular drive member 8 secured to the drive plate 6, a magnetizing coil 7 provided in the drive member 8, and a driven member 10 secured by a spline engagement to an input shaft 9 of the transmission 2, leaving a gap 11 from the drive member 8 and driven member 10. Magnetic powder is provided in a powder chamber 12 and the gap 11 is adapted to be filled with the powder. A cap 13 is secured to the drive member 8. The cap 13 has a cylindrical portion coaxial with the input shaft 9, on which slip rings 14 are securely provided. The slip rings 14 are connected to the drive member 8 by a lead X. Brushes 16 pressed against the slip rings 14 are supported in a holder 17 and connected to a hereinafter described control system by a lead Y.

In such a construction, the drive plate 6 and the drive member 8 rotate together with the crankshaft 5 and the magnetic powder sealed in the powder chamber 12 is moved to the inner surface of the drive member 8 by centrifugal force. If the magnetizing coil 7 is excited by the current applied through the lead Y brushes 16, slip rings 14 and lead X, the drive member 8 is magnetized to produce a magnetic flux passing through the driven member 10. Thus, the powder is aggregated in the gap 11, so that the power of the engine is transmitted to the input shaft 9 through the clutch.

In the transmission 2, 1st to 4th speed drive gears 18 to 21 are integrally provided on the input shaft 9. The drive gears 18 to 21 are engaged with driven gears 23 to 26, respectively. The driven gears 23 to 26 are rotatably mounted on an output shaft 22 parallel to the input shaft 9. Each of the driven gears 23 and 24 is adapted to be engaged with the output shaft 22 by operating a synchronizer 27 and each of the driven gears 25 and 26 is engaged with the output shaft 22 by a synchronizer 28 in a well known manner. Further, a reverse drive gear means 29 is provided. Thus, by operating a selector lever (not shown) of the transmission, the driven gear 23 is coupled selectively with the output shaft 22 by the synchronizer 27 and the 1st speed is obtained on the output shaft 22 and the speed of the output shaft 22 is greatly decreased. The 2nd, 3rd and 4th speed may be respectively obtained accordingly.

Further, provided on an end of the output shaft 22 is an output gear 30 which engages with a ring gear 32 in a differential 31 of the final reduction device 3 to transmit the output of the output shaft 22 of the transmission 2 directly from the ring gear 32 to side gears 36 through a case 33, a spider 34 and pinions 35, and further to driving wheels of a motor vehicle through wheel shafts 37.

Figure 3:
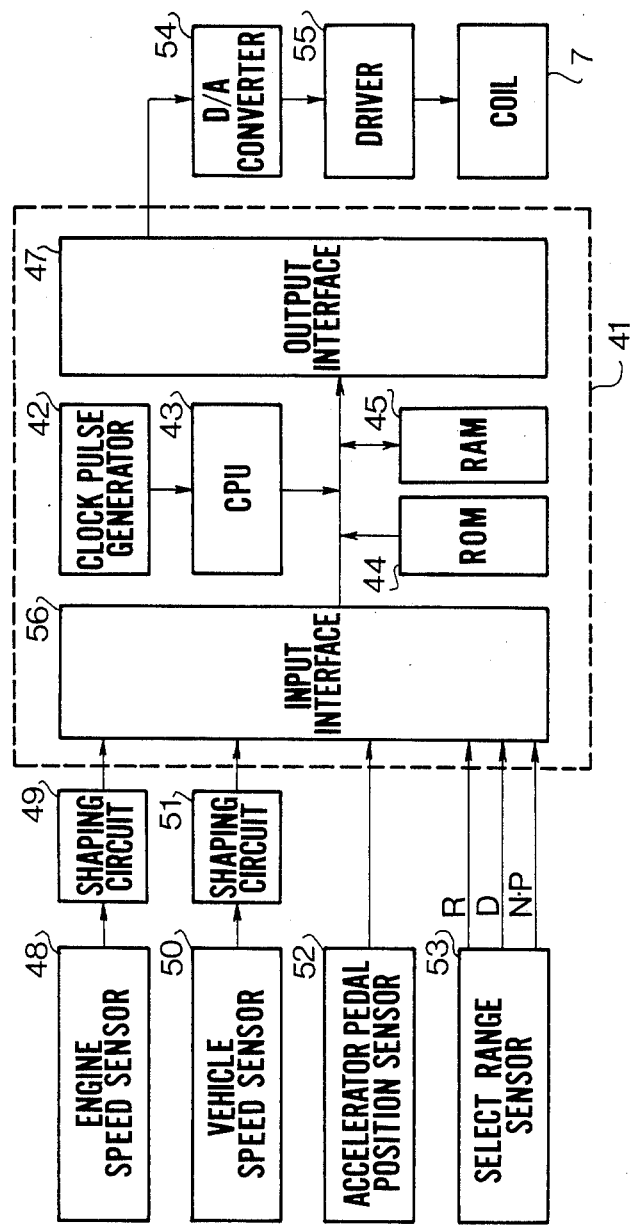
FIG. 3 is a block diagram showing an embodiment of the present invention.

FIG. 3 shows the control system which is provided with an engine speed sensor 48, a vehicle speed sensor 50, an accelerator pedal position sensor 52 for producing an output signal dependent on the degree of the depression of an accelerator pedal of the motor vehicle, and a select range sensor 53 for producing an output signal when the selector lever is positioned at a drive position other than the neutral position and the parking position, that is one of 1st to 4th speed positions or reverse the position in the transmission of FIG. 1.

Output signals of the sensors 48, 50 are applied to an input interface 56 of a microcomputer 41 through waveform shaping circuits 49, 51, respectively. The output signal of the sensors 52 and 53 are also applied to the input interface 56. The microcomputer comprises a clock pulse generator 42, CPU 43, ROM 44, RAM 45, and output interface 47. The output of the microcomputer is converted to an analog signal by a D/A converter 54 and is applied to the coil 7 through a driver 55.

Figure 4:
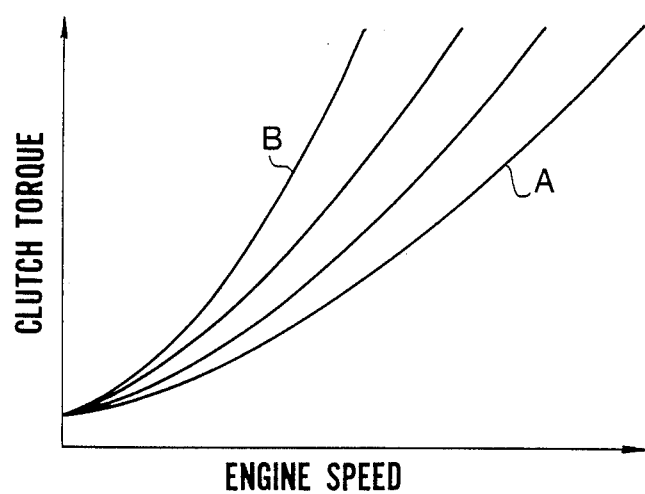
FIG. 4 is a graph showing the relationship between engine speed and clutch torque in the system of the present invention.

The control system of the present invention is adapted to control the characteristic of clutch torque in accordance with engine speed so as to smoothly start the motor vehicle. The clutch torque characteristic of the present invention is shown in FIG. 4. A line A shows the slowest characteristic at the beginning of the depression of the accelerator pedal. Thereafter, the characteristic changes towards a line B as the magnitude of the acceleration of the engine speed increases. Namely, when the accelerator pedal is depressed during a large acceleration, the magnitude of the acceleration of engine speed increases, so that the clutch torque characteristic rapidly moves to the line B, and when the acceleration is small, the characteristic slowly moves to the line B. When the acceleration is zero, that is engine speed is constant, the characteristic is determined between the lines A and B. When engine speed decreases (deceleration of engine speed), the characteristic moves to the line A.

Figure 5:
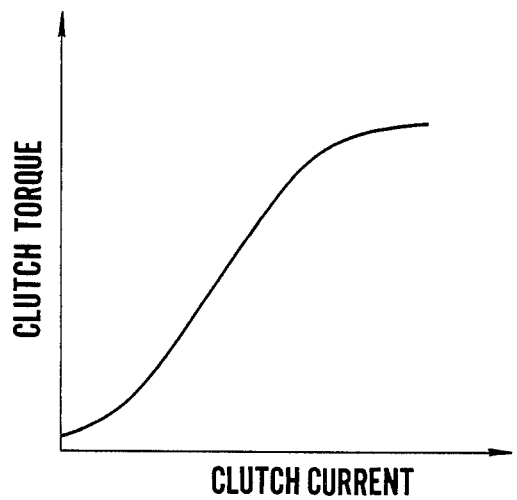
FIG. 5 is a graph showing the relationship between the clutch current and clutch torque.
Figure 6:
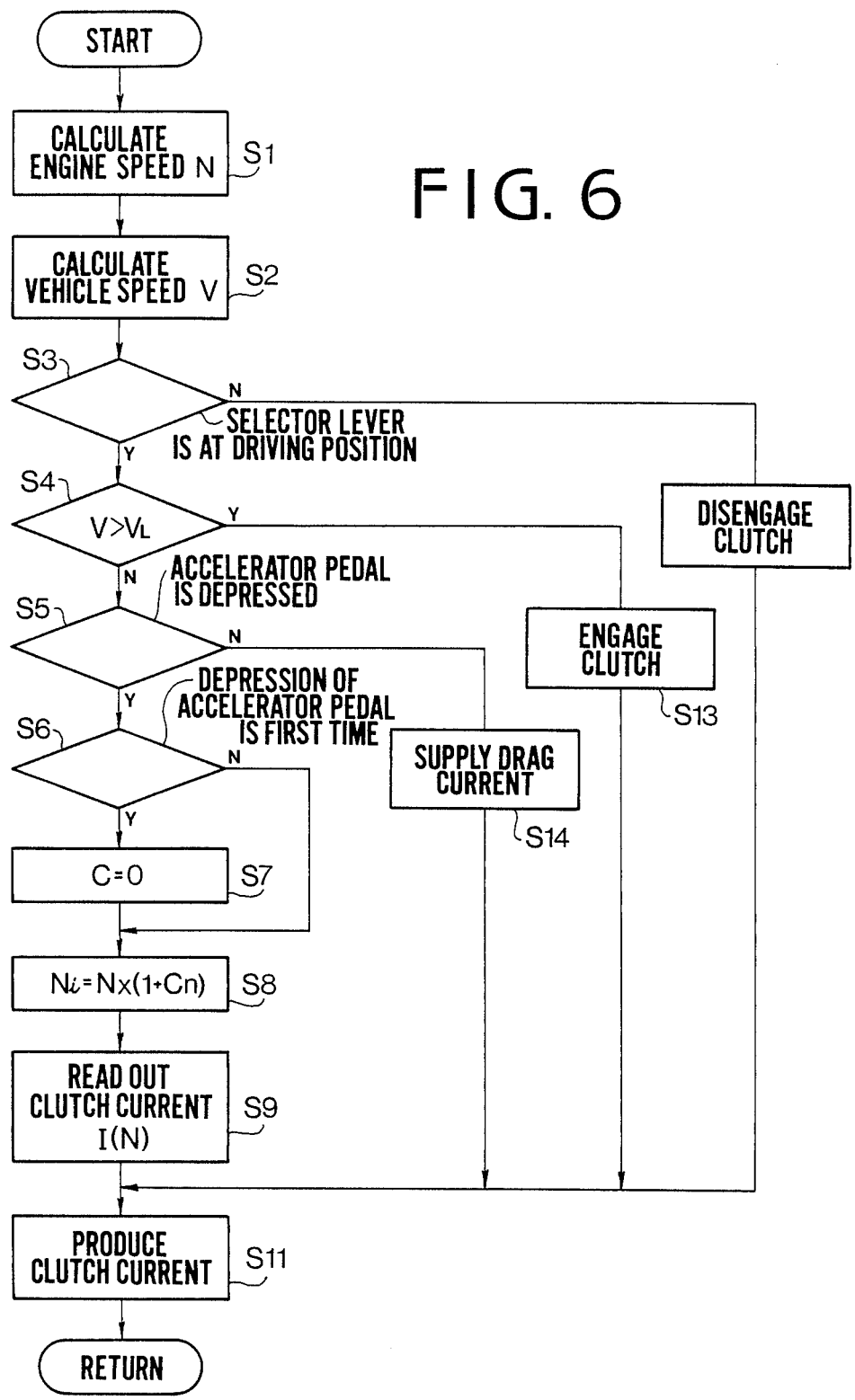
FIGS. 6 and 7 are flowcharts showing the operation of the system.
Figure 8:
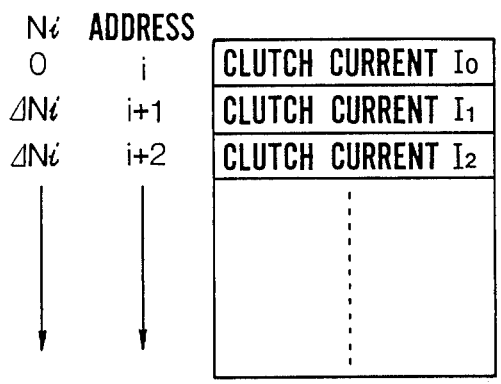
FIG. 8 is a schematic view showing a table for clutch current.
Figure 7:
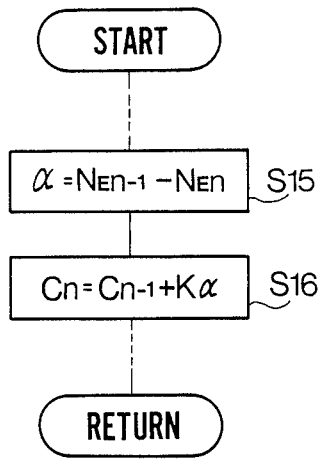
Figure 9:
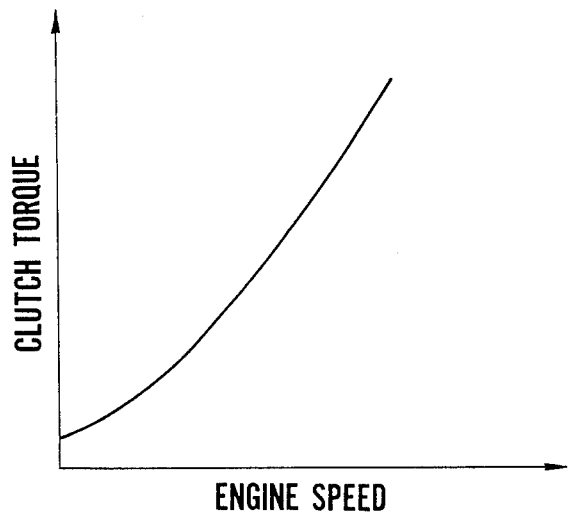
FIG. 9 is a graph showing the relationship between clutch torque and the engine speed of a conventional system.

Explaining the operation of the control system with reference to FIGS. 6 and 7, at a step $S_1$, engine speed N is read out, and at a step $S_2$, vehicle speed V is read out. Thereafter, at a step $S_3$, it is determined whether the selector lever is at driving positions. If the selector lever is at the neutral position or parking position, the clutch current is cut off to disengage the clutch. If the selector lever is at a driving position or reverse position, the program proceeds to a step $S_4$, where it is determined whether the vehicle speed V is higher than a predetermined vehicle speed $V_L$(10–25 Km/h). If V is higher than $V_L$, the rated clutch current flows passing through the coil to entirely engage the clutch at step $S_{13}$. If V is lower than $V_L$, the program proceeds to a step $S_5$, where it is determined whether the accelrator pedal is depressed. If the accelerator pedal is released, a drag current is supplied to the coil 7 at step $S_{14}$ so as to partially engage the clutch. If the accelerator pedal is depressed, the program proceeds to a step $S_6$, where it is decided whether the depression of the accelerator pedal is the first time after the engine is started. If it is the first time, the program proceeds to a step $S_7$, where the number of times of the depression, that is, zero is set (C=0). If the depression is not the first time, or after the operation at the step $S_7$ has finished, the program proceeds to a step $S_8$, where the product of the engine speed N and $(1+C_n)$ is performed to obtain a correcting value $N_i$($N_i=N(1+C_n)$). At a step $S_9$ clutch current I(N) according to the value $N_i$ is derived from a table in the ROM 44. FIG. 8 shows the table, in which clutch current is determined so as to produce the clutch torque as shown in FIG. 5.

On the other hand, the coefficient $C_n$ is obtained by a subroutine shown in FIG. 7. The subroutine is initiated by a timer at intervals of a predetermined time ΔT (several m. sec. to (50 m. sec.), in which n represents the number of the operation, that is number of times the subroutine has been performed. At a step S15, acceleration α of engine speed N is obtained by the operation of $(N_{n-1}-N_n)$ for the interval ΔT. That is the step S15 acts as an acceleration determining means. At a step $S_{16}$, the coefficient $C_n$ is obtained by adding Kα to the last coefficient $C_{n-1}$, where K is a constant $(C_n=C_{n-1}+Kα)$. At the first cycle of the operation, C is zero, so that $N_i$ is N ($N_i$=N). After the first operation, the coefficient $C_n$ is determined in accordance with the acceleration of engine speed. For example, when $C_n$=0.5, $N_i$=1.5N. Clutch current is obtained from the table of FIG. 8 by the value of $N_i$=1.5N. The coefficient $C_n$ is determined between zero and a limit value. The limit value corresponds to the characteristic B of FIG. 4, and the coefficient of zero ($C_n$=0) corresponds to the characteristic A.

Although the above above-described control system employs a manual transmission, an infinitely variable belt drive transmission can be employed for the system of the present invention.

From the foregoing it will be understood that the present invention provides a system which controls the clutch current in accordance with the rate of variation of engine speed, whereby a motor vehicle can be started smoothly.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling an electromagnetic clutch of an engine for a motor vehicle having a transmission, comprising:

engine speed sensing means for producing an engine speed signal dependent on the engine speed of the engine;

vehicle speed sensing means for producing a vehicle speed signal in a low vehicle speed range;

acceleration determining means responsive to the engine speed signal for producing an accleration signal representing magnitude of acceleration of the engine speed;

selector lever position detecting means for producing a selector lever signal when a selector lever of the transmission is positioned at a position other than a neutral position and a parking position;

circuit means for supplying clutch current to a magnetizing coil of the electromagnetic clutch for engaging the clutch;

control means responsive to the engine speed signal, vehicle speed signal, acceleration signal, and selector lever signal for controlling said circuit means to determine the clutch current at engagement of the electromagnetic clutch, the control means being such that the rate of change of clutch current with respect to engine speed increases as the magnitude of acceleration of the engine speed increases.

2. The system according to claim 1, wherein the control means comprises a microcomputer.

3. The system according to claim 2 wherein said control means is for reading out a magnitude of the clutch current from a table in accordance with the magnitude of the acceleration of the engine speed.

4. The system according to claim 3, wherein said control means is for controlling the clutch current $I(N)$ according to the value $N_i$, where N is the engine speed and $N_i$ is a correcting value equal to $N(1+C_n)$, where $C_n = C_{n-1} + K\alpha$, where $C_n$ is a coefficient, K is a constant, n is number of engine acceleration measurement repeated at predetermined intervals, and $\alpha$ is acceleration of the engine speed.

* * * * *